United States Patent [19]

Schwöbel et al.

[11] Patent Number: 5,401,594
[45] Date of Patent: Mar. 28, 1995

[54] HYDROPHILIZED SEPARATOR MATERIAL OF NONWOVEN FABRIC FOR ELECTROCHEMICAL CELLS AND A METHOD FOR ITS PRODUCTION

[75] Inventors: Rolf-Peter Schwöbel, Waldmichelbach; Harald Hoffmann, Dossenheim, both of Germany

[73] Assignee: Firma Carl Freudenberg, Weinheim, Germany

[21] Appl. No.: 131,832

[22] Filed: Oct. 5, 1993

[30] Foreign Application Priority Data

Oct. 5, 1992 [DE] Germany .................. 42 33 412.8

[51] Int. Cl.⁶ .............................. H01M 2/14
[52] U.S. Cl. ................... 429/142; 429/144; 429/247; 429/248
[58] Field of Search ............ 429/142, 144, 247, 248

[56] References Cited

U.S. PATENT DOCUMENTS

| | | | |
|---|---|---|---|
| 4,091,181 | 5/1978 | Merritt, Jr. | 429/94 |
| 4,359,510 | 11/1982 | Taskier | 429/248 X |
| 4,378,414 | 3/1983 | Furukawa et al. | 429/144 |
| 4,650,730 | 3/1987 | Lundquist et al. | 429/62 |

OTHER PUBLICATIONS

Patent Abstracts of Japan, vol. 17, No. 473 (E-1423) 27 Aug. 1993 & JP-A-05 114 397 (Sanyo Electric Co. Ltd.) 7 May 1993.
DataBase WPI Week 8203, Derwent Publications Ltd., London, GB; AN-8204521E & JP-A-56 156 668 (Tokyo Shibaura Elec. Ltd.) 3 Dec. 1981.

Primary Examiner—Prince Willis, Jr.
Assistant Examiner—M. Nuzzolillo
Attorney, Agent, or Firm—Kenyon & Kenyon

[57] ABSTRACT

The subject invention relates to a hydrophilized separator material of nonwoven fabric that is useful for electrochemical cells having an aqueous alkaline electrolyte. The nonwoven fabric comprises a mixture of lower-melting and higher-melting polyamide and/or polyolefin fibers that are compressed together in a sealed manner by softening the lower-melting fiber portions with pressure and heat. The separator material is hydrophilized by moistening it with 0.5 to 7% by weight, with respect to the dry weight of the nonwoven fabric, of deionized water. The subject invention further relates to the method for hydrophilizing the nonwoven fabric.

4 Claims, No Drawings

HYDROPHILIZED SEPARATOR MATERIAL OF NONWOVEN FABRIC FOR ELECTROCHEMICAL CELLS AND A METHOD FOR ITS PRODUCTION

FIELD OF THE INVENTION

The present invention relates to flat, flexible, electrolyte-resistant separator materials that consist of nonwoven fabric and are capable of being wetted rapidly and completely with an aqueous alkaline electrolyte. The present invention, furthermore, relates to a method for the production of such separator materials.

BACKGROUND OF THE INVENTION

The most common separator materials are nonwoven fabrics of polyamide and/or polyolefin fibers due to the flexibility and electrolyte resistance of such fibers. Such separator materials serve to prevent contact between the positive and negative electrodes and, thus, tend to prevent an undesired flow of current in electrochemical cells having a liquid alkaline electrolyte, however, without substantially impeding the passage of ions through the liquid electrolyte.

Aqueous alkaline electrolyte is used, for example, in the electrochemical cells of nickel-cadmium-cells or nickel-hydrogen and nickel-metal hydride batteries. In this case, both the positive and the negative electrodes consist of thin rollable strips of the active electrode materials. Between the two strips, the separator material consisting of nonwoven fabric of the type mentioned above is inserted and rolled up together with the electrodes. After the rolling-up step, this four-layer structure consists of a positive and a negative electrode and two layers of separator material. The coil thus produced is inserted into a cup-shaped housing of nickel-plated steel sheet, which is then filled with highly concentrated aqueous potassium hydroxide solution. The electrolyte must be absorbed quickly under these circumstances by the nonwoven separator material and the electrolyte must be deposited in the pores of the nonwoven separator material.

Unfortunately, polyamide or polyolefin-fiber separator materials are by their very nature hydrophobic and, therefore, by themselves cannot satisfy the important requirement of rapid and good wettability to the extent, as mentioned above, required by the electrolyte. Poor wettability leads to disturbances in the manufacture of the cells, since the electrolyte added cannot be absorbed sufficiently rapidly and, thus, is not sufficiently distributed within the cell. The result is that upon subsequent addition of electrolyte the electrolyte will overflow and soil the production equipment. Also, upon subsequent operation of the battery, gas bubbles will accumulate on and in a separator material having poor wettability, with the gas bubbles thoroughly impeding the passage of ions and, thus, perceptibly reducing the performance of the battery and even blocking it. In the case of gas-tight electrochemical cells, under these circumstances there is also produced an excess pressure that can lead to a bursting of the cell housing. Several tests were carried out to make separator materials of basically hydrophobic nonwoven materials sufficiently hydrophilic for use in an electrochemical cell.

Thus, for example, U.S. Pat. No. 3,947,537 describes a treatment of the fiber surface with a surface-active agent, a surfactant.

DE-A 25 43 149 mentions the addition of hydrophilic substances at the polymer melt stage, that is, at the point of spinning the filaments which are to be used as separator materials.

Neither method has proven useful since any introduction of additional chemicals into the sensitive chemical system of an electrochemical cell can lead to disturbances, the causes of which can be reduced only with difficulty and with the use of numerous different chemical substances. It is therefore preferable to construct separators only from precisely defined fiber materials and to use only those hydrophilizing additives which do not cause any disturbances in the operation of the electrochemical cell.

DETAILED DESCRIPTION OF THE PREFERRED EMBODIMENTS

Hydrophilized separator materials of nonwoven fabric for electrochemical cells with aqueous alkaline electrolyte are produced predominantly by thermal solidification of a nonwoven fabric that is made of polyamide and/or polyolefin fibers and that is formed by carding. 30 to 50 weight percent of the fibers or fiber portions used in this process are comprised of a material which has a lower softening point than the material used in the remaining fibers.

The nonwoven fabric is heated in an oven to a temperature which is above the softening range of the lower-melting material and below that of the second material of the fiber mixture. The bonding then takes place by compressing at the exit of the oven, the nonwoven fabric being calibrated to form a layer of separator material having the desired final thickness, preferably between two rolls, and then cooled. After this, the previously softened fibers are autogenously fused, at least in part, to the fibers in their immediate vicinity. Such a method is described for instance in DE-OS 21 64 901.

It is the object of the present invention to hydrophilize the polyolefin and polyamide fibers that are used to form a nonwoven fabric for a separator material. Under these circumstances, the use of surfactants prior to or after production of the nonwoven fabric can be dispensed with and the wettability of the nonwoven fabric for a 30% aqueous alkaline solution can still be assured.

The substance used to produce such hydrophilicity is to be compatible with all materials of the electrochemical cell.

It has now surprisingly been found that the wettability, that is, the hydrophilicity of the nonwoven fabric of polyamide and/or polyolefin fibers, which has been completely dried out in the oven at the temperatures present in the oven, can be significantly improved by the uniform spraying on of deionized water. This is surprisingly achieved after the cooling and prior to the rolling-up step, if one uses 0.5 to 7% weight percent of deionized water, wherein the weight percent is given with respect to the dry weight of the nonwoven fabric leaving the oven and after cooling to room temperature.

Upon storage at room temperature, separator materials that have been moistened in this manner show a significant improvement of the wettability for aqueous 30% potassium hydroxide solutions. These solutions are stable up to five days without it being necessary to use any surfactants.

The following examples will illustrate the invention and the extent of the hydrophilizing that was observed.

EXAMPLES OF THE PREFERRED EMBODIMENTS

Example 1

From a fiber mixture of 30% by weight polypropylene fibers, dtex 2/38 mm, and of 70% by weight bicomponent fibers, dtex 3.3/64 mm, consisting of polypropylene and polyethylene in a side-by-side arrangement, a nonwoven fabric having a weight of 72 g/m$^2$ was produced on a carding machine. This nonwoven fabric was heated to a temperature of 145° C. in an oven and calibrated to a thickness of 0.22 mm between two cold rolls. A part of the nonwoven fabric compacted in this manner was moistened by spraying on a total of 1 g/m$^2$ deionized water before the rolling-up step. A second part remained unmoistened.

The wettability by 30% aqueous potassium hydroxide solution was then determined by measuring the capillary absorption height after one minute and after ten minutes. The separator material which had been premoistened with water in the manner described above reached an absorption height of 35 mm after one minute and 83 mm after ten minutes, while the unmoistened product showed an absorption height of only 16 mm after one minute and 54 mm after ten minutes.

Example 2

From a fiber mixture of 50% by weight polyamide-6.6 fibers, dtex 1.7/40 mm, and 50% by weight of a bicomponent fiber of the same composition as in example 1, there was produced on a carding machine a nonwoven fabric having a weight of 80 g/m$^2$. This nonwoven fabric was heated to a temperature of 145° C. in an oven and calibrated to a thickness of 0.27 mm. A part of the nonwoven fabric produced in this manner was moistened by spraying on a total of 1 g/m$^2$ deionized water prior to the rolling-up step. A second part remained unmoistened.

The wettability testing with 30% aqueous potassium hydroxide solution showed that the premoistened separator material reached an absorption height of 30 mm after one minute and 65 mm after ten minutes, while the unmoistened product showed an absorption height of only 8 mm after one minute and 35 mm after ten minutes.

Example 3

From a fiber mixture of 65% by weight polyamide-6.6 fibers, dtex 1.7/40 mm, and 35% by weight of a polyamide fiber, dtex 3.3/40 mm, which comprised in part polyamide-6 and in part polyamide-6.6, a core-/shell-bicomponent fiber was developed, and there was produced on a carding machine a nonwoven fabric having a weight of 70 g/m$^2$. This nonwoven fabric was heated to a temperature of 235° C. in an oven and reduced to a thickness of 0.25 mm between two cold rolls. A part of the nonwoven fabric produced and compacted in this manner was moistened by spraying on 1 g/m$^2$ deionized water before the rolling-up step. A second part remained unmoistened.

The wettability testing with 30% aqueous potassium hydroxide solution showed that the premoistened material reached a capillary absorption height of 22 mm after one minute and 67 mm after ten minutes while the unmoistened product showed an absorption height of 5 mm after one minute and only 25 mm after ten minutes.

The improved usefulness that is achieved by the method of the invention as described in the examples is long-lasting. That is, even after storage for five days at room temperature, the absorption height of the premoistened separator materials that was achievable after ten minutes was still higher by 22% (Example 1), 27% (Example 2) and 29% (Example 3) than in the case of the corresponding unmoistened reference samples.

What is claimed is:

1. A hydrophilized separator material consisting of a nonwoven fabric formed from a mixture of fibers having different softening ranges, wherein said fibers are selected from the group consisting of polyamide and polyolefin fibers and wherein said fibers are compressed and bonded together to form a layer of separator material, and wherein said layer of separator material is moistened with about 0.5 to about 7 weight percent, with respect to the dry weight of said nonwoven fabric, of deionized water.

2. The hydrophilized separator material of claim 1 wherein 30 to 50 weight percent of said fibers comprise a material having a lower softening point than the remaining fibers.

3. A method of preparing a hydrophilized separator material comprising:
   carding a mixture of fibers having different softening ranges to form a nonwoven fabric, wherein said fibers are selected from the group consisting of polyamide and polyolefin fibers;
   heating said nonwoven fabric to a temperature that is above the softening range of the lower-melting fibers;
   compressing and bonding said non-woven fabric;
   calibrating the compressed and bonded nonwoven fabric to form a layer of separator material;
   spraying said layer of separator material with 0.5 to 7 weight percent, with respect to the dry weight of said separator material, of deionized water.

4. The method according to claim 3 wherein 30 to 50 weight percent of said fibers comprise a material having a lower softening point than the material used in the remaining fibers.

* * * * *